United States Patent
Alfred et al.

(10) Patent No.: US 10,609,616 B2
(45) Date of Patent: *Mar. 31, 2020

(54) SYSTEM AND METHOD FOR USING MOBILITY INFORMATION IN HETEROGENEOUS NETWORKS

(71) Applicant: Alfred Consulting LLC, Fredericksburg, VA (US)

(72) Inventors: Joseph Anderson Alfred, Fredericksburg, VA (US); Yonatan Aharon Levy, Manalapan, NJ (US)

(73) Assignee: Alfred Consulting LLC, Fredericksburg, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/188,698

(22) Filed: Nov. 13, 2018

(65) Prior Publication Data

US 2019/0082370 A1 Mar. 14, 2019

Related U.S. Application Data

(63) Continuation-in-part of application No. 14/978,751, filed on Dec. 22, 2015, now Pat. No. 10,129,807.

(51) Int. Cl.
| | |
|---|---|
| *H04W 84/04* | (2009.01) |
| *H04W 36/32* | (2009.01) |
| *H04W 36/30* | (2009.01) |
| *H04W 36/08* | (2009.01) |

(52) U.S. Cl.
CPC .......... *H04W 36/32* (2013.01); *H04W 36/08* (2013.01); *H04W 36/30* (2013.01); *H04W 84/045* (2013.01)

(58) Field of Classification Search
CPC .... H04W 36/30; H04W 36/04; H04W 72/044
See application file for complete search history.

(56) References Cited

U.S. PATENT DOCUMENTS

| | | | |
|---|---|---|---|
| 5,499,386 | A | 3/1996 | Karlsson |
| 8,521,163 | B2 | 8/2013 | Wu et al. |
| 8,725,169 | B2 | 5/2014 | Xiao et al. |
| 8,744,449 | B2 | 6/2014 | Song et al. |
| 8,880,088 | B2 | 11/2014 | Wigren et al. |
| 9,213,675 | B1 | 12/2015 | Kolton et al. |

(Continued)

FOREIGN PATENT DOCUMENTS

| | | |
|---|---|---|
| WO | WO 2013/048331 | 4/2013 |
| WO | WO 2015/176782 | 11/2015 |

OTHER PUBLICATIONS

Guruprasad I Naik, "LTE WLAN Interworking for Wi-Fi Hotspots," Proceeding of the Second International Conference on Communication Systems and Networks (COMSNETS), Jan. 2010.
Ashish K. Dayama, "Nokia and Qualcomm found the MulteFire Alliance to combine the best of LTE and WiFi," Dec. 16, 2015, https://blog.networks.nokia.com/partners-and-customers/2015/12/16/nokia-and-qualcomm-multefire-alliance-to-combine-lte-and-wifi/.
Ericsson Wi-Fi Calling, http://www.ericsson.com/ourportfolio/wi-fi-calling, retrieved Dec. 21, 2015.

(Continued)

*Primary Examiner* — Joseph E Dean, Jr.

(57) ABSTRACT

Disclosed herein are systems and methods related to reducing or making more efficient handovers from one cell to another cell in a communications network. The method includes receiving mobility data for a device being serviced by a first cell, classifying the device based on the mobility data to yield a classification and making a handoff decision when handing off the device from the first cell to a second cell based at least in part on the classification. An example of the mobility data is a speed at which the device is moving.

15 Claims, 13 Drawing Sheets

(56) References Cited

U.S. PATENT DOCUMENTS

| | | | |
|---|---|---|---|
| 10,129,807 B2* | 11/2018 | Alfred | H04W 36/04 |
| 2007/0076664 A1 | 4/2007 | An | |
| 2008/0188234 A1 | 8/2008 | Gorokhov et al. | |
| 2009/0046665 A1 | 2/2009 | Robson et al. | |
| 2009/0239535 A1 | 9/2009 | Chun | |
| 2012/0327797 A1 | 3/2012 | Siomina et al. | |
| 2012/0129550 A1 | 5/2012 | Hannan et al. | |
| 2013/0084862 A1 | 4/2013 | Zou et al. | |
| 2013/0130690 A1 | 5/2013 | Hunukumbure et al. | |
| 2013/0244664 A1 | 9/2013 | Song | |
| 2014/0171088 A1 | 6/2014 | Edara | |
| 2014/0220973 A1 | 8/2014 | Lunden et al. | |
| 2015/0050934 A1 | 2/2015 | Jung | |
| 2015/0111594 A1 | 4/2015 | Cui et al. | |
| 2015/0119040 A1 | 4/2015 | Amirijoo | |
| 2015/0141017 A1 | 5/2015 | Krishnamoorthy | |
| 2015/0141019 A1 | 5/2015 | Bengtsson | |
| 2015/0141021 A1 | 5/2015 | Kapoulas | |
| 2015/0264622 A1 | 9/2015 | Ueda | |
| 2015/0334616 A1 | 11/2015 | Hahn | |

OTHER PUBLICATIONS

3GPP Specification Detail 23.261, http://www.3gpp.org/DynaReport/23261.htm, retrieved Dec. 21, 2015.

3GPP TS 23.261 V12.0.0 (Sep. 2014), Technical Specification, pp. 1-22, retrieved Dec. 21, 2015.

"Netgear AT&T Unite Pro" https://www.att.com/devices/netgear/unite~pro.html#sku=sku6910270, retrieved Dec. 21, 2015.

Qualcomm Research, "Improving LTE and Wi-Fi integration with PDCP aggregation," Qualcomm Technologies, Inc., pp. 1-3, retrieved Dec. 21, 2015.

Verizon Wireless, "Ditch your low-speed Internet," retrieved Dec. 21, 2015.

Monica Alleven, "Google, Broadcom, Wi-Fi Alliance push for more collaboration between LTE-U/LAA and Wi-Fi," Fierce Wireless Tech, Jun. 15, 2015 http://www.fiercewireless.com/tech/story/google-broadcom-wi-fi-alliance-push-more-collaboration-between-lte-ulaa-and/2015-06-15.

* cited by examiner

SYSTEM AND METHOD FOR USING MOBILITY INFORMATION IN HETEROGENEOUS NETWORKS

PRIORITY

The present application is a continuation-in-part of U.S. patent application Ser. No. 14/978,751, filed Dec. 22, 2015, the content of which is herein incorporated by reference in its entirety.

BACKGROUND

1. Technical Field

The present disclosure relates to cell assignments in cellular networks and more specifically to a system and method of using mobility data about a speed at which a device is moving to make cell handoff assignments.

2. Introduction

Having a mix of large and small cells in Long Term Evolution (LTE) and other networks has the potential for better utilization of scarce wireless spectrum resources. However, when cellular devices connect to cells based on signal strength, the variability in connection quality and increase in rate of handovers can lead to reduced efficiency. The result can make heterogeneous cells into a liability instead of an advantage. As efforts to inter-operate cellular and Wi-Fi networks lead to consolidated networks, Wi-Fi antennas will add to the diversity of wireless access points that can be used.

There is a need and potential advantage of having different types of cells to improve coverage and usage of spectrum, giving rise to heterogeneous networks ("het nets"). There are difficulties in properly executing handovers between different cells in both cases where the cells utilize the same protocol such as LTE or where different cells utilize different protocols such as an LTE cell abutting or overlapping with a Wi-Fi cell.

SUMMARY

The following description relates to a number of different examples of different approaches and systems for handling cell assignments and/or cell handoffs in a cellular environment. The example method relates to making handoff decisions. The method includes receiving mobility data for a device being serviced by a first cell, classifying the device based on a mobility state associated with the mobility data to yield a classification and making a handoff decision when handing off the device from the first cell to a second cell based at least in part on the classification. The mobility state can be computed from the mobility data or estimated from the mobility data. In one example, the classification can be one of slow, medium and fast speed. The classifications or the classes are usually separated by boundaries which can be fixed or variable. For example, a classification can be a speed or a rate of movement of 10-30 MPH. The boundary of 10 MPH at the low end and 30 MPH at the high end can be fixed or variable based on one or more parameters. The boundaries can be re-set.

When the system makes a handoff decision, each classification can include at least one of a preferred cell type and at least one acceptable cell type. The preferred cell type for a slow speed classification can include a micro cell type and a small cell type and an acceptable cell type for the slow speed classification includes a large cell type. The preferred cell type of a medium speed classification can include the small cell type, and the acceptable cell type for the medium speed classification includes the large cell type. The preferred cell type of a fast classification can include the large cell type, and the acceptable cell type for the fast classification includes none.

When making a handoff decision, the device or the system, in one example, can only choose a non-preferred cell type when a received signal is stronger than a higher threshold compared to a threshold required for a preferred cell type. A reselection of a cell can be triggered when the first cell no longer provides a sufficient signal and when the first cell is of a non-preferred type. Handing off can include handing off to the second cell when the second cell is of the preferred type and is suitable.

The classification can include a location in the first cell, potentially of a device, and a path traveled across the first cell. Making the handoff decision can be further based at least in part on a first spectral efficiency of the first cell and a second spectral efficiency of the second cell. Making the handoff decision can further be based at least in part on a bandwidth used by the device and available bandwidth of the second cell.

A system example includes a processor and a computer-readable storage device storing instructions which, when executed by the processor, cause the processor to perform certain operations. The operations include receiving mobility data for a device being serviced by a first cell, classifying the device based on the mobility data to yield a classification and making a handoff decision when handing off the device from the first cell to a second cell based at least in part on the classification.

Another example includes a computer-readable storage device storing instructions which, when executed by a computing device, cause the computing device to perform operations including receiving mobility data for a device being serviced by a first cell, classifying the device based on the mobility data to yield a classification and making a handoff decision when handing off the device from the first cell to a second cell based at least in part on the classification.

A second example relates to making an initial assignment of a device to a service cell. In this example, a method includes receiving mobility data for a device, classifying the device based on a mobility state associated with the mobility data to yield a mobility class and assigning the device to a serving cell based at least in part on the mobility class. The mobility state can be computed from the mobility data or estimated from the mobility data.

When assigning the device to the serving cell, a reselection can be triggered when a first cell no longer provides a sufficient signal and when the first cell is of a non-preferred type. Assigning the device to the serving cell can include assigning the device to a second cell when the second cell is of the preferred type and is suitable.

The mobility class can include one of a location of the device in the serving cell and a path traveled across the serving cell. Assigning the device to the serving cell can further be based at least in part on a spectral efficiency of the serving cell. Assigning the device to the serving cell can further be based at least in part on a bandwidth used by the device and available bandwidth of the serving cell. Assigning the device to the serving cell can further be based at least in part on multiple prioritized lists of cells, each list of the multiple prioritized lists of cells including cells of a same type. In one aspect, cells in a higher priority list are measured more frequently than cells on a lower priority list.

In one possible implementation, the mobile device monitors its serving cell as well as the neighbor cells from the list with the highest priority. If this list (of the highest priority) is of size smaller that a given parameter, the next list is also considered. In another possible implementation, the cells with higher priority are measured more frequently than cells with lower priority. In determining what cell to handover to, cells from a higher priority neighbor list are always considered before those from a lower priority list.

A system aspect of this second example includes a processor and a computer-readable storage device storing instructions which, when executed by the processor, cause the processor to perform operations including receiving mobility data for a device, classifying the device based on a mobility state associated with the mobility data to yield a mobility class and assigning the device to a serving cell based at least in part on the mobility class. A computer-readable storage device aspect of the second example includes a computer-readable storage device storing instructions which, when executed by a computing device, cause the computing device to perform operations including receiving mobility data for a device, classifying the device based on a mobility state associated with the mobility data to yield a mobility class and assigning the device to a serving cell based at least in part on the mobility class.

A third example relates to tracking the distribution of load across cells. Once a system with device classification and assignment to cell types is in place, the system can be monitored to track the distribution of users and load level across cells. If the monitoring detects strong imbalances of cell loads, then, in addition to adjusting the power level of cells, the system disclosed herein makes it possible to dynamically adjust the mobility class boundaries, in order to optimize or improve the spectrum efficiency and capacity of the network.

One example of such a condition is the temporary concentration of slow users in a certain area. Under such circumstances, reducing the value of the class boundaries would allow more users to be classified as more mobile and get preference for being served by larger cells. Another option is to reduce the power of micro cells in the area so that fewer users are assigned to them.

According to this third example, a method is disclosed for balancing cell loads in a network in which a device is classified into a mobility class based on mobility data and the device is assigned to a serving cell based at least in part on the mobility class. The method includes monitoring a distribution of devices and load levels across a plurality of cells to yield an analysis. When the analysis indicates an imbalance of cell loads, the method includes adjusting a boundary of the mobility class. When the analysis indicates an imbalance of cell loads, the method includes adjusting a power level at least one cell of the plurality of cells. When the analysis indicates the imbalance of cell loads, the method further includes performing both of adjusting the power level at least one cell of the plurality of cells and adjusting the boundary of the mobility class. Adjusting the boundary of the mobility class includes one of increasing an upper speed associated with an upper boundary of the mobility class and decreasing a lower speed associated with a lower boundary of the mobility class. Performing one of adjusting a power level at least one cell of the plurality of cells and adjusting a boundary of the mobility class improves a spectrum efficiency of the network relative to a previous spectral efficiency prior to the adjusting of one of the power level and the boundary of the mobility class. It is noted that in radio transmissions, the data (bits) are composed of control bytes as well as content bytes. The closer a device is to an antenna or cell tower, the better the spectral efficiency. When there are handoffs or during a handoff process, there are often more control bytes being transmitted than content bytes.

Performing one of adjusting a power level at least one cell of the plurality of cells and adjusting a boundary of the mobility class improves a capacity of the network relative to a previous capacity prior to the adjusting of one of the power level and the boundary of the mobility class. When assigning the device to serving cell, each mobility class includes at least one of a preferred cell type and at least one acceptable cell type. The preferred cell type for a slow speed classification includes a micro cell type and a small cell type, and an acceptable cell type for the slow speed classification includes a large cell type. The preferred cell type of a medium speed classification includes the small cell type, and the acceptable cell type for the medium speed classification includes the large cell type.

In one example, the device only chooses a non-preferred cell type only when a received signal is stronger than a higher threshold compared to a threshold required for a preferred cell type. When the device is assigned to the serving cell, a reselection is triggered based on one or more parameters or events. For example, the reselection can be triggered when a first cell no longer provides a sufficient signal and/or when the first cell is of a non-preferred type. Assigning the device to the serving cell includes assigning the device to a second cell when the second cell is of the preferred type and is suitable. The mobility class can include one of a location of the device in the serving cell and a path traveled across the serving cell. The device can be assigned to the serving cell based at least in part on multiple prioritized lists of cells, each list of the multiple prioritized lists of cells including cells of a same type.

An example method includes receiving mobility data for a device being serviced by a first cell, wherein the mobility data includes a vector indicating a motion of the device; and classifying the device based on the mobility data to yield a classification. When making a reselection or a handoff decision, a cell type for the classification can include at least one of a preferred cell type and at least one of an acceptable cell type.

An example of a system according to the third example is a system for balancing cell loads in a network in which a device is classified into a mobility class based on mobility data and the device is assigned to a serving cell based at least in part on the mobility class. The system includes a processor and a computer-readable storage device storing instructions which, when executed by the processor, cause the processor to perform operations including monitoring a distribution of devices and load levels across a plurality of cells to yield an analysis and when the analysis indicates an imbalance of cell loads, adjusting a boundary of the mobility class. The system can be a network infrastructure component or a mobile device like a smartphone or cell phone.

A computer-readable storage device example of this third example includes a non-transitory computer-readable storage device or medium that stores instructions which, when executed by a computing device, cause the computing device to balance cell loads in a network in which a device is classified into a mobility class based on mobility data and the device is assigned to a serving cell based at least in part on the mobility class. The instructions causing the computing device to perform operations including monitoring a distribution of devices and load levels across a plurality of cells to yield an analysis and when the analysis indicates an imbalance of cell loads, adjusting a boundary of the mobility class.

DETAILED DESCRIPTION

Various example of the disclosure are described in detail below. While specific implementations are described, it should be understood that this is done for illustration purposes only. Other components and configurations may be used without parting from the spirit and scope of the disclosure. Moreover, it should be understood that features or configurations herein with reference to one example can be implemented in, or combined with, other examples or examples herein. That is, terms such as "embodiment", "variation", "aspect", "example", "configuration", "implementation", "case", and any other terms which may connote an embodiment, as used herein to describe specific features or configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other.

The present disclosure addresses concepts related to performing cell assignments and/or cell handoffs in a heterogeneous cellular system. A brief introductory description of a basic general purpose system or computing device in FIG. 1 which can be employed to practice the concepts, methods, and techniques disclosed is illustrated. A more detailed description of various approaches to handoffs and cell assignments will then follow.

Figure 1:
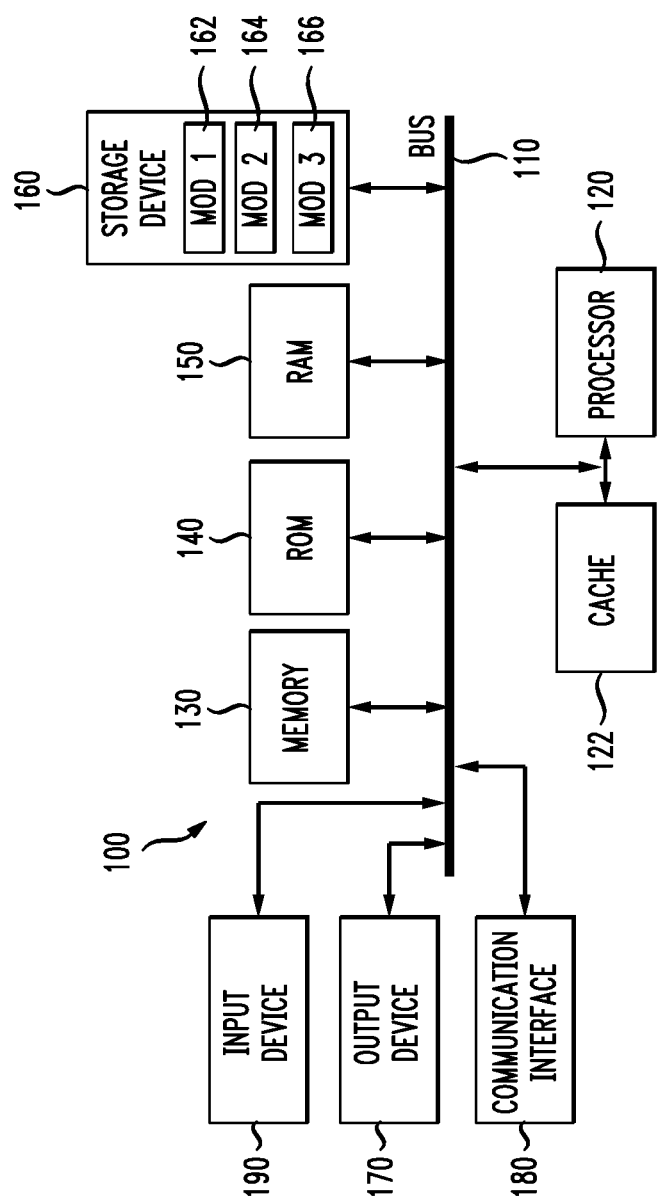
FIG. 1 illustrates an example system.

These variations shall be described herein as the various examples are set forth. The disclosure now turns to FIG. 1. With reference to FIG. 1, an exemplary system and/or computing device 100 includes a processing unit (CPU or processor) 120 and a system bus 110 that couples various system components including the system memory 130 such as read only memory (ROM) 140 and random access memory (RAM) 150 to the processor 120. The system 100 can include a cache 122 of high-speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various operations or actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the processor. The processor 120 may be a self-contained computing system, containing multiple cores or processors, a bus, memory controller, cache, etc. A multi-core processor may be symmetric or asymmetric. The processor 120 can include multiple processors, such as a system having multiple, physically separate processors in different sockets, or a system having multiple processor cores on a single physical chip. Similarly, the processor 120 can include multiple distributed processors located in multiple separate computing devices, but working together such as via a communications network. Multiple processors or processor cores can share resources such as memory 130 or the cache 122, or can operate using independent resources. The processor 120 can include one or more of a state machine, an application specific integrated circuit (ASIC), or a programmable gate array (PGA) including a field PGA.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 160 can include software modules 162, 164, 166 for controlling the processor 120. The system 100 can include other hardware or software modules. The storage device 160 is connected to the system bus 110 by a drive interface. The drives and the associated computer-readable storage devices provide nonvolatile storage of computer-readable instructions, data structures, program modules and other data for the computing device 100. In one aspect, a hardware module that performs a particular function includes the software component stored in a tangible computer-readable storage device in connection with the necessary hardware components, such as the processor 120, bus 110, display 170, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the device 100 is a small, handheld computing device, a desktop computer, or a computer server. When the processor 120 executes instructions to perform "operations", the processor 120 can perform the operations directly and/or facilitate, direct, or cooperate with another device or component to perform the operations.

Although the exemplary example(s) described herein employs the hard disk 160, other types of computer-readable storage devices which can store data that are accessible by a computer, such as magnetic cassettes, flash memory cards, digital versatile disks (DVDs), cartridges, random access memories (RAMs) 150, read-only memory (ROM) 140, a cable containing a bit stream and the like, may also be used in the exemplary operating environment. Computer-readable storage media, computer-readable storage devices, or computer-readable memory devices, expressly exclude transitory media such as transitory waves, energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system example is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120 that is purpose-built to operate as an equivalent to software executing on a general purpose processor. For example, the functions of one or more processors presented in FIG. 1 may be provided by a single shared processor or multiple processors. (Use of the term "processor" should not be construed to refer exclusively to hardware capable of executing software.) Illustrative examples may include microprocessor and/or digital signal processor (DSP) hardware, read-only memory (ROM) 140 for storing software performing the operations described below, and random access memory (RAM) 150 for storing results. Very large scale integration (VLSI) hardware examples, as well as custom VLSI circuitry in combination with a general purpose DSP circuit, may also be provided.

The logical operations of the various examples are implemented as: (1) a sequence of computer-implemented steps, operations, or procedures running on a programmable circuit within a general use computer, (2) a sequence of computer-implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage devices. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations. System 100 may have other modules (not shown in FIG. 1) configured to control the processor 120.

One or more parts of the example computing device 100, up to and including the entire computing device 100, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately, however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 120 can include all types of processors disclosed herein, including a virtual processor. However, when referring to a virtual processor, the processor 120 includes the software components associated with executing the virtual processor in a virtualization layer and underlying hardware necessary to execute the virtualization layer. The system 100 can include a physical or virtual processor 120 that receive instructions stored in a computer-readable storage device, which cause the processor 120 to perform certain operations. When referring to a virtual processor 120, the system also includes the underlying physical hardware executing the virtual processor 120.

Figure 2A:
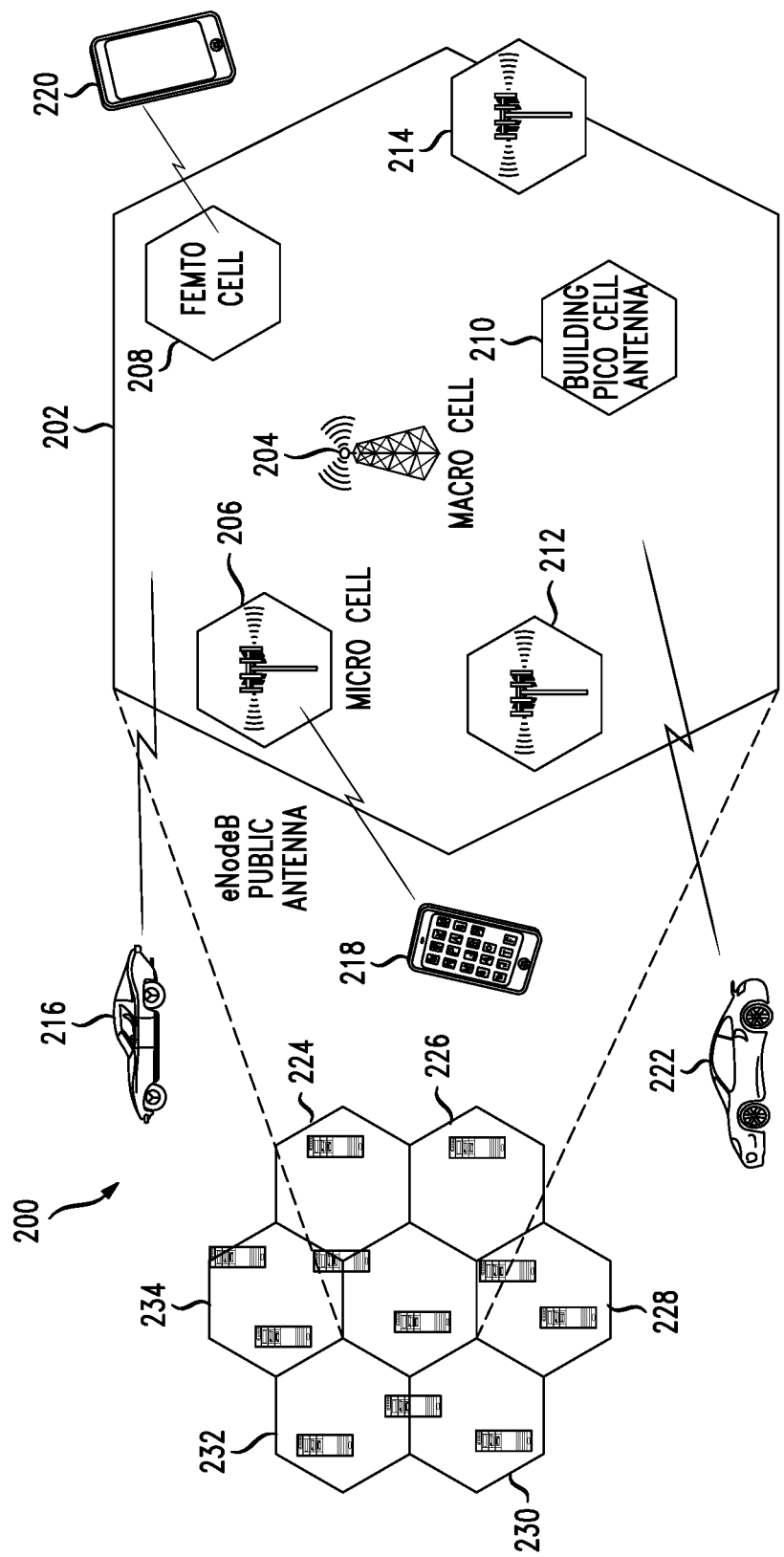
FIG. 2A illustrates an example heterogeneous cellular system.

Having disclosed some components of a general computing system in FIG. 1, the disclosure now turns to FIG. 2A, which illustrates an aspect of this disclosure. FIG. 2A represents heterogeneous networks 200 which can be associated with a wireless protocol such as LTE, or different wireless protocols. As shown in FIG. 2A, a macro cell 202 is included within a group of macro cells 224, 226, 228, 230, 232, and 234. Within each macro cell is a cell tower 204 as well as various other types of towers or cells. For example, micro cells 206, 212 and 214 operate using an eNodeB public antenna. A mobile device 218 is shown as being in communication with the micro cell 206. A femto cell 208 could also communicate with another mobile device 220. Another example is shown of a building pico cell 210. Also shown in FIG. 2A are other mobile communication systems such as vehicles 216 and 222 which are communicating with the macro cell 202. FIG. 2A thus provides an example of how heterogeneous networks can exist such that mobile devices 218, 220, 216, 222, when moving through a series of cells, may transition from one protocol to another and/or from cells that have larger sizes such as the macro cell 202 into and out of cells with smaller sizes such as micro cell 206 and vice versa.

This disclosure provides methods and systems that leverage the different types of cells in a heterogeneous wireless network with the goals of improving the service level given to users, as well as the efficiency and capacity of the network. We offer at least three new ideas that can be integrated into one system to accomplish these goals. The first idea relates to classification of user devices based on their mobility state into a mobility class. The next relates to the assignment of user devices to serving cells based on the mobility class. The third idea relates to a dynamic adjustment of cell power and/or mobility class boundaries.

Most of the procedures described herein can be implemented on one or more of a user device, in a radio network controller (RNC) which can coordinate a group of cells, and/or in a network processor (NP) that can perform more central optimization. Different steps in a coordinated series of operations can also be performed on different devices. Device control is distributed in nature but could provide faster reaction to changes in mobility state, and some of the algorithms fit this mode of operation. Using an RNC or NP provides a more centralized decision point, but reaction to changing conditions can be relatively slower. Changes in loading conditions can also influence the mode of operation. For example, if an NP becomes overloaded, more processing can be done at the device and/or RNC level.

We now provide more details about the first concept of classifying user devices. A system can classify user devices based on the device's mobility state. The mobility state is a value representing a speed at which the user (and hence the device) is moving. The mobility states can be obtained or estimated using several potential methods. Each device and/or a processor anywhere in the network can employ one or more of these methods to determine the mobility state. For example, the mobility state can be 10 MPH or 70 MPH. The mobility state could also include a vector component in which the state includes a parameter related to a direction that the user device is moving. Thus, the mobility state could include values such as (65,10), which could be the speed and the compass heading (10 degrees in this case). The mobility states may also include other information such as acceleration, altitude, rate of ascent/descent, etc.

The mobility state can be a mobility estimation based on device coordinates that are sampled every time unit. The device speed can be computed based on the change in the coordinates. Simple averaging over a time window or exponential smoothing is one example of an approach that can be used to compute the current mobility state. The system can also or alternately use smart car technology to convey speed. Devices inside a moving vehicle can have their speed determined by the vehicle's speedometer and transmitted to the device or a network processor and then used to compute the mobility state. For other users, wearable devices, such as a fitness monitor, can be used.

A mobility estimation based on handover rate or time in cell can be used to establish a mobility state. The terms "handover," "handoff," and their variants refer to the process of transferring an ongoing call or data session of a device from one cell to another cell with minimal or no interruption of service, typically as the device's geographic location changes. For example, assume that the device measures the time between handoffs. A network processor can estimate the mobility state based on the cell size and time in cell. This is a relatively less accurate method to determine mobility state. However, it can be used as feedback metric to evaluate the system.

The mobility state can also be determined by a non-mobile declaration by the user device. This approach requires wireless protocols to allow devices to declare themselves as stationary or mobile. While a device is stationary, it does not need to perform mobility-related measurements.

Once the mobility state is determined, using one or more of the techniques disclosed above, the device or a network processor then classifies each device into a mobility class. This can be accomplished in a number of different ways. One example approach is to use an association of each mobility class with a range of mobility states. An example is shown in Table 1.

TABLE 1

Mobility Classes

| | |
|---|---|
| Class 1 (Slow) | Stationary and slow devices with mobility state lower than 10 meters per minute |
| Class 2 (Medium) | Medium speed devices with mobility state between 10 and 100 meters per minute |
| Class 3 (Fast) | Fast devices with mobility state over 100 meters per minute |

The speed limits/thresholds are used to classify devices as defined by class boundaries. Class boundaries in the above example are 10 meters per minute, which defines the boundary between Class 1 (Slow) and Class 2 (Medium). Another class boundary in this example is 100 meters per minute which defines the boundary between Class 2 (Medium) and Class 3 (Fast). Of course, the structure can include more than three classes and the particular boundaries can be any parameter or even a group of parameters. For example, the class could include a speed range as well as a direction range. If the direction a device is going will lead to a micro cell within a certain amount of time, that could be, coupled with the speed, a certain class. An example of this approach could be: Class 2 (Medium, 12 degree movement which leads to a micro cell within 2 minutes). The classification may also be made based on the relative speed at which the device is approaching or distancing away from a micro cell regardless of the direction in which the device is moving.

Given a network with multiple types of cells, differing in size and power levels, and user devices classified based on mobility, as described above, the disclosure now provide rules to assign devices to cells based on their mobility class.

For illustration and simplicity of explanation, the case of three types of cells is presented: Large, Small, and Micro cells. Of course, the system could employ more than three defined types of cells. Such definitions could include parameters based on one or more of size, geography, elevation, building/infrastructure within a cell, shape, signal strengths, signal range, device usage, numbers of devices within a cell, device mobility within a cell (i.e., does the cell cover a freeway where the average device speed is 65 MPH), foliage and other obstructions, etc.

The present disclosure deals with setup and management of radio bearers and does not change the setup and control of S-type bearers between cells and network gateways.

Described herein is the enhancement of two sets of rules that are critical to the operation of mobile networks: cell selection for Radio Resource Control (RRC)-idle devices and handover for RRC-connected devices. As background, when a device is turned on, it has to find a qualified serving cell and then go through an authentication procedure and attachment to the network. The mobile device is then communicating with a serving cell in an RRC-idle state without acquiring radio resources. In this state, selection and reselection of serving cell is under the device's control. Once it establishes an RRC connection, the device periodically reports its measurements and is being monitored by the network to assure quality of service. When the quality of service from the current serving cell is not acceptable and/or there is another cell better suited to serve, the network can request a handover.

The device in the RRC-idle state will operate as follows: The device selects and reselects a serving cell based on signal strength measurement called Reference Signal Received Power (RSRP). Specifically, a cell is suitable for serving the device if its RSRP exceeds a minimum threshold level and, in addition, satisfies certain service conditions—such as, being on a network whose service provider is on the device's prioritized list and is not barred for service—which do not really pertain to this disclosure.

Introducing cell types and mobility classes adds a novel dimension to the cell selection process. The disclosure provides two possible rules:

A first rule is a simple preference rule that specifies a preference order as depicted in Table 2.

TABLE 2

Preference Rule for Mobility Classes

| Device Mobility Class | Preferred Cell Types | Acceptable Cell Types |
|---|---|---|
| Class 1 - Slow | Micro, Small | Large |
| Class 2 - Medium | Small | Large |
| Class 3 - Fast | Large | None |

Table 2 is only exemplary and could, of course, have a number of different parameters therein. For example, a slow mobile device would first look for a suitable micro or small cell, which could offer Wi-Fi communication, and only if none is available it would consider a large cell. A fast-moving device may only consider large cells and is not allowed to consider micro or small cells. This latter rule prevents excessive number of reselections.

A second rule could require an additional parameter $RSRP_{diff}$ which is specified by the network. In this case, a cell is suitable for a device based on a result from the following equation:

$$RSRP_{meas} > RSRP_{min} + I(MC, CT) \times RSRP_{diff},$$

where $RSRP_{min}$ is the minimum acceptable receive power, $RSRP_{meas}$ is the measured value, and $I(MC, CT)=0$ if cell type CT is preferred for a user equipment (UE) mobility class MC, and $I(MC, CT)=1$ otherwise.

A more general version of this rule is one with a matrix of values $RSRP_{diff}(MC, CT)$, and a cell is suitable if:

$$RSRP_{meas} > RSRP_{min} + RSRP_{diff}(MC,CT).$$

Under this rule, the device will choose a non-preferred cell type only if the received signal is stronger than a higher threshold compared to the threshold required for a preferred cell type. For both rules, a reselection is triggered when the serving cell no longer provides a good enough signal. In addition, if the current serving cell is of the non-preferred type, a reselection can occur if a cell of the preferred type is detected and is suitable.

Another example process relates to the device in an RRC-Connected State. Once a device is connected, and if the rule for RRC-Idle is followed, the device would be served by a cell that fits its mobility class. At this point, in most LTE or other protocol networks, the device monitors its serving cell and listed neighbor cells.

The feature introduced herein is that instead of a simple list of neighbor cells, there are multiple prioritized lists which can be analyzed. Each list includes cells of the same type, or could include cells of different types or have characteristics sharing a certain number of parameters. In one possible implementation, the device monitors its serving cell as well as the neighbor cells from the list with the highest priority. If this list (of the highest priority) is of size smaller than a given parameter, the next list is also considered. In another possible implementation, the cells with higher priority are measured more frequently than cells with lower priority. In determining what cell to handover to, cells from a higher priority neighbor list are always considered before those from a lower priority list.

When a user (and hence the device) changes its mobility class, the change is detected by the mobility measurement method(s) in use and is included in measurement reports to the serving cell (actually a base station in the cell, commonly referred to as eNodeB). Initially, the device continues to be served by the same cell, but rules for reselecting a new serving cell (for RRC-Idle UE) and for handover (for RRC-Connected UE) would now be according to the new mobility class.

For example, if a walking user (medium class), currently served by a small cell, enters a vehicle, the device will likely move out of its current cell very quickly. In this case, the device will soon be classified as fast and will now choose the best large cell. By the same token, a fast device in a large cell, may enter a building and become stationary. The now-stationary device would still be served by the large cell but would now look for, and be qualified to be served by a micro or small cell.

Once a system with device classification and assignment to cell types is in place, the system can be monitored to track the distribution of users and load level across cells. If the monitoring detects strong imbalances of cell loads, then in addition to adjusting the power level of cells, this disclosure makes it possible to dynamically adjust the mobility class boundaries, in order to optimize the spectrum efficiency and capacity of the network.

One example of such a condition is the temporary concentration of slow users in a certain area. Under such circumstances, reducing the value of the class boundaries would allow more users to be classified as more mobile and get preference for being served by larger cells. Another option is to reduce the power of micro cells in the area so that fewer users are assigned to them.

The adjustment of boundaries can be also performed based on historical data. Perhaps during rush hour, the boundaries are adjusted given the high volume of movement of devices through a region of cells. However, during certain times and in certain area the traffic is bad and thus the devices move slowly. Thus, adjusting the boundaries can take into account such actual device movements experienced in the cells. Adjustments can be made for any number of reasons, including the addition of a new cell or elimination of a cell, extra charges paid by a user that enable an adjustment or to give a device priority, and so forth.

Figure 2B:
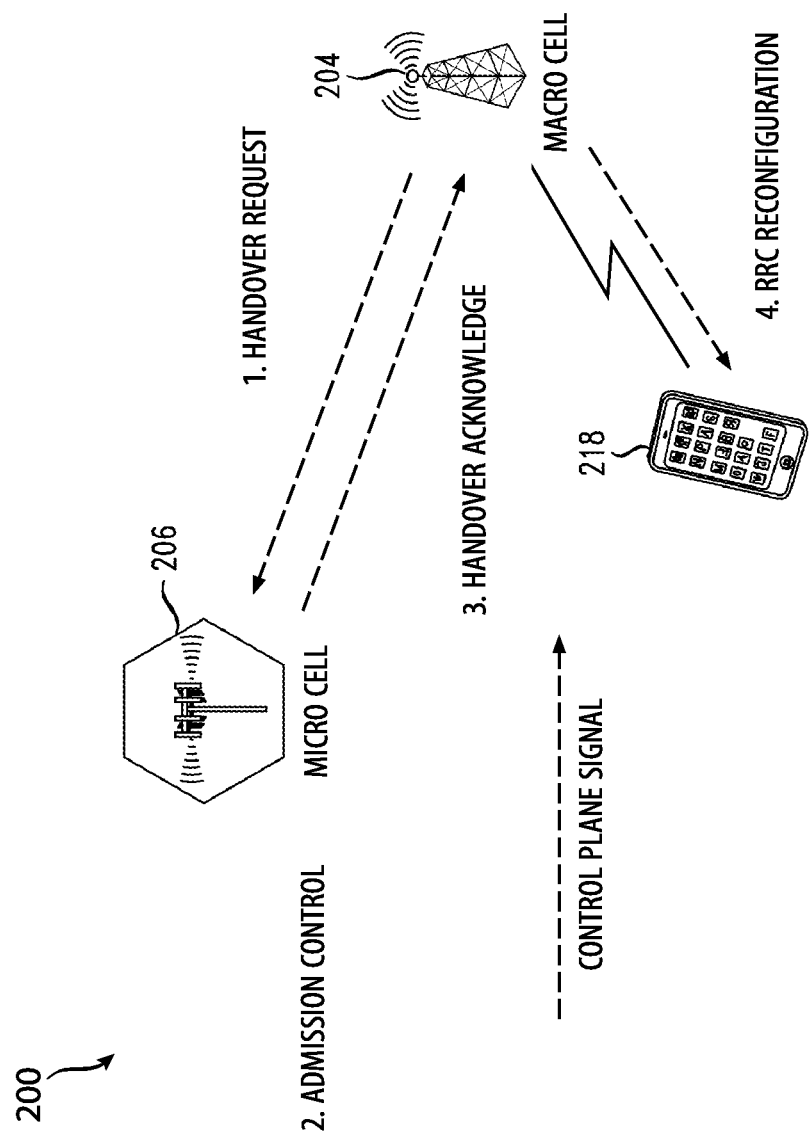
FIG. 2B illustrates an aspect of a control plane.
Figure 2C:
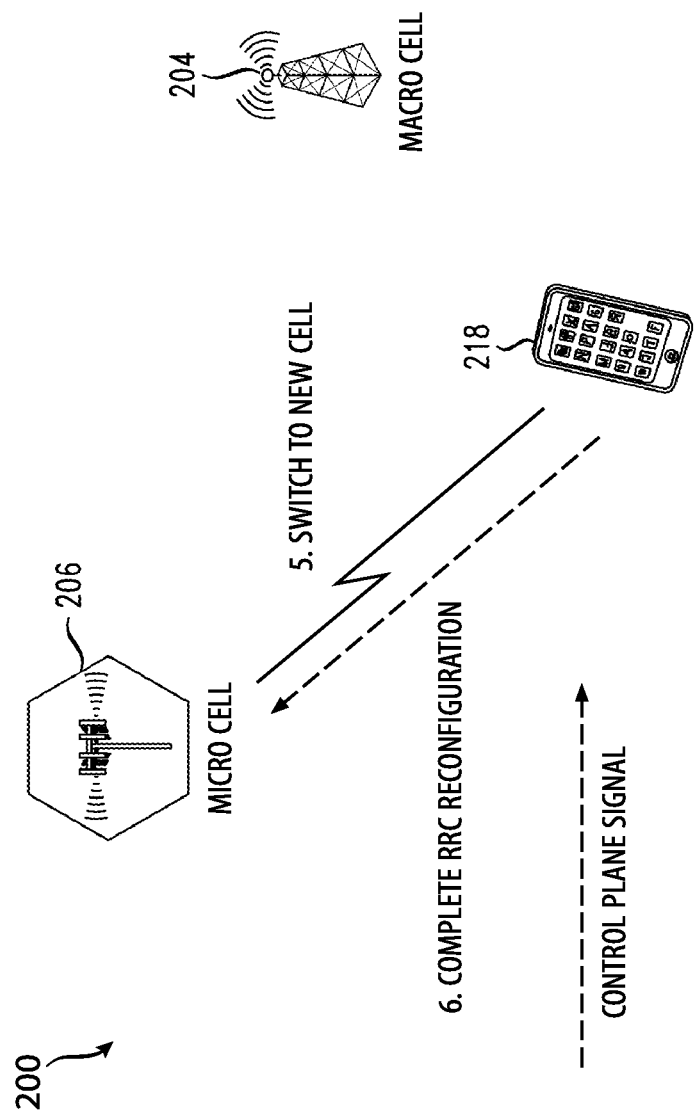
FIG. 2C illustrates another control plane aspect.

FIGS. 2A and 2B illustrate control plane signals between the microcell 206, the macro cell 204 and the device 218. The signals relate to (1) a handover request, (2) an admission control signal, (3) a handover acknowledge, (4) a radio resource control (RRC) reconfiguration signal, (5) a switch to new cell signal and (6) a completion of the RRC reconfirmation signal.

Figure 3:
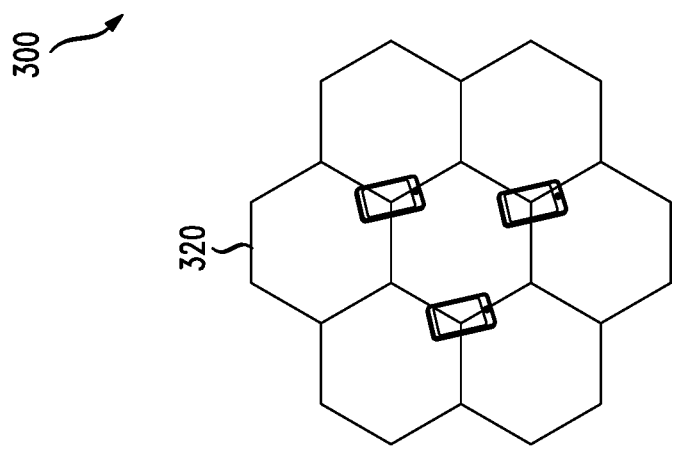
FIG. 3 illustrates another example of a heterogeneous cellular system.
Figure 3:
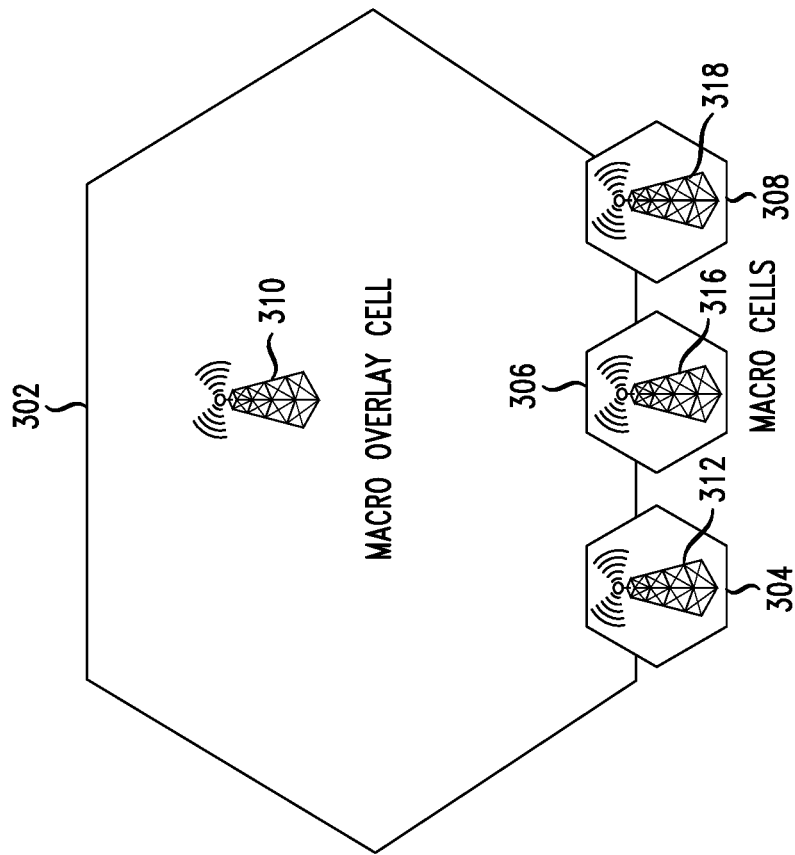

FIG. 3 illustrates an example power level of a serving cell and neighboring cells. For example, feature 320 illustrates a group of cells which can be similar to a group of cells shown in FIG. 2A. Feature 302 illustrates a macro overlay cell which covers a region associated with cell tower 310, which has overlapping micro cells such as micro cell 304 serviced by tower 312, micro cell 306 serviced by tower 316 and micro cell 308 serviced by tower 318. The principles disclosed herein cover different methods and processes for making cell assignments as well as cell-to-cell handoffs in a heterogeneous network and in such a scenario where there is overlap between different types of cells.

Figure 4:
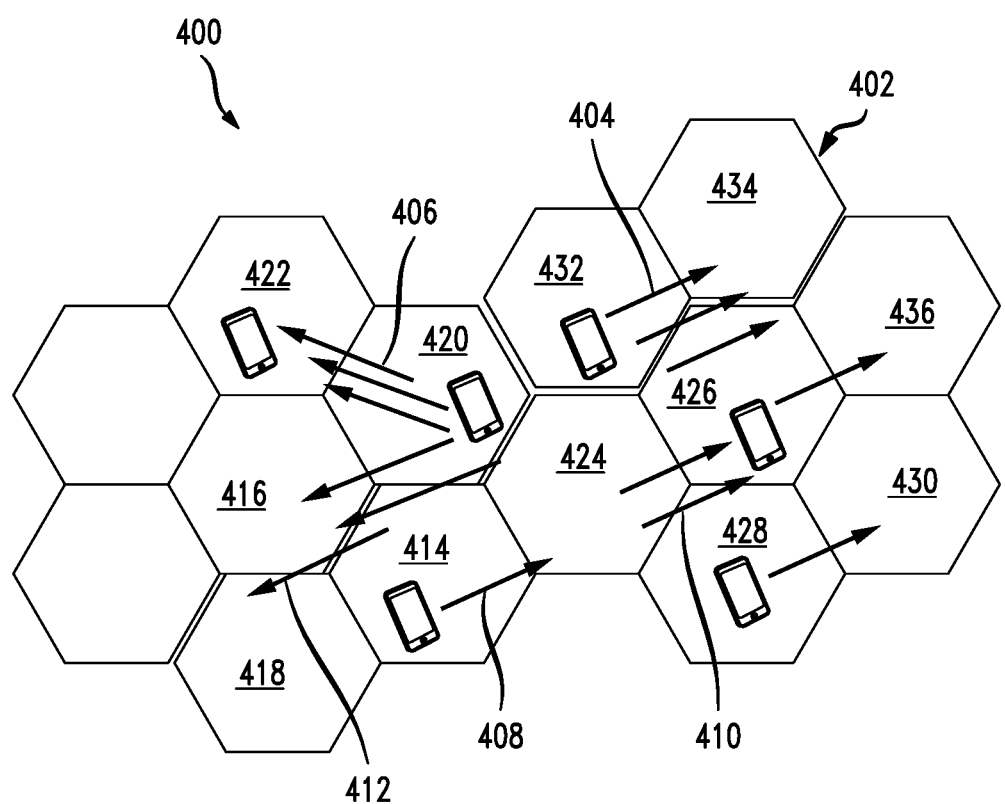
FIG. 4 illustrates a network in which devices move from cell to cell.

FIG. 4 illustrates an example handoff rate. As is shown in the group of cells 400, various cells such as 414, 416, 418, 420, 422, 424, 426, 428, 430, 432, 434, and 436 are shown. Each is serviced by a cell tower or antenna of some sort (not shown). What is represented in FIG. 4 is different speeds of devices moving through various cells. For example, three arrows are shown as feature 406 which can represent a fast moving device moving from cell 420 to 422. A single arrow is shown as feature 408 which can represent a slow moving device moving from cell 414 to 424. Arrow 412 can represent a slow moving device from cell 414, and into cell 416 for only a brief moment, and then into cell 418. Arrow 412 illustrates an example in which two quick handoffs would need to be processed as the device moved from cell 414 to 416 and then again soon thereafter from cell 416 to 418. Similarly, feature 410 illustrates movement of a device transitioning from cell 424 to cell 428 as well as another transition from cell 428 to 426. Feature 404 illustrates another set of arrows representing movement of a device from cell 432 to 434 which could include a portion of the movement in cell 426. As can be appreciated, the principles disclosed herein improve the cell assignment and handoff capabilities in order to minimize the processing necessary to perform handoffs.

Figure 5:
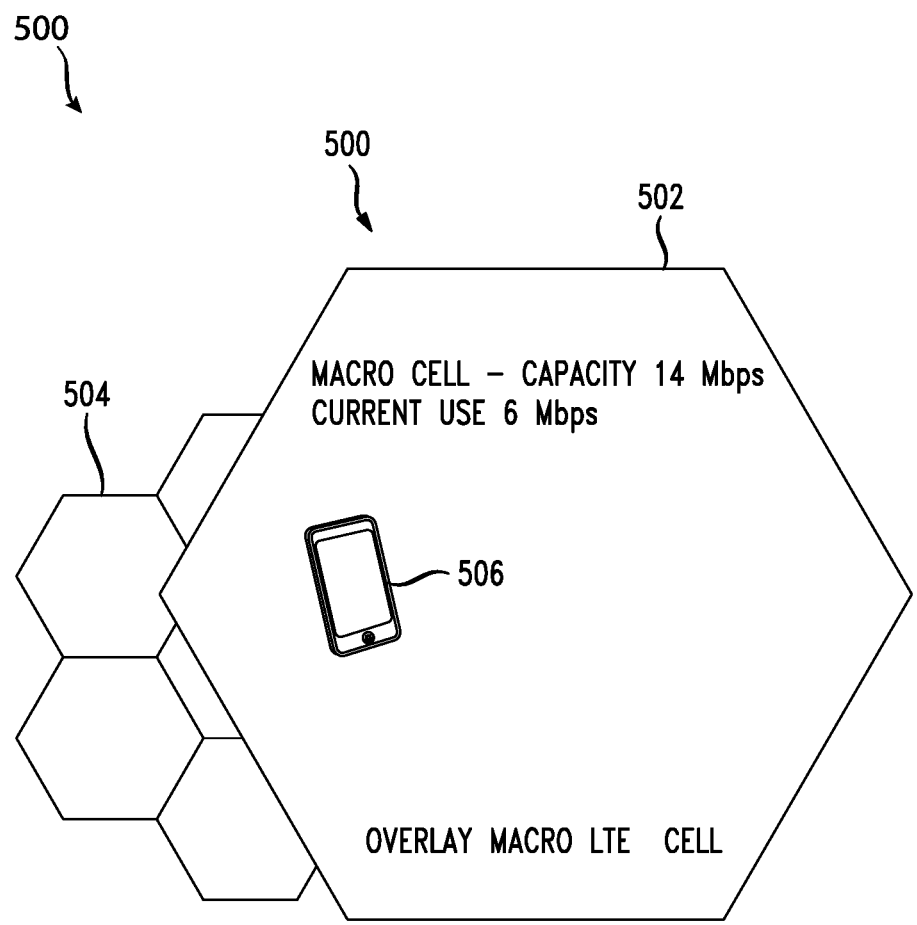
FIG. 5 illustrates a macro cell overlay environment.

FIG. 5 illustrates another example cell assignment. The system 500 shows a number of different cells including a macro cell 502 having a capacity of 14 Mbps with a current use of 6 Mbps. Device 506 is a smartphone that is using 5 Mbps. Note that cell 504 which is a microcell having a capacity of 5 Mbps but currently is communicating with 3 Mbps. The present disclosure enables the assignment of cells in order to improve spectral efficiency.

Figure 6:
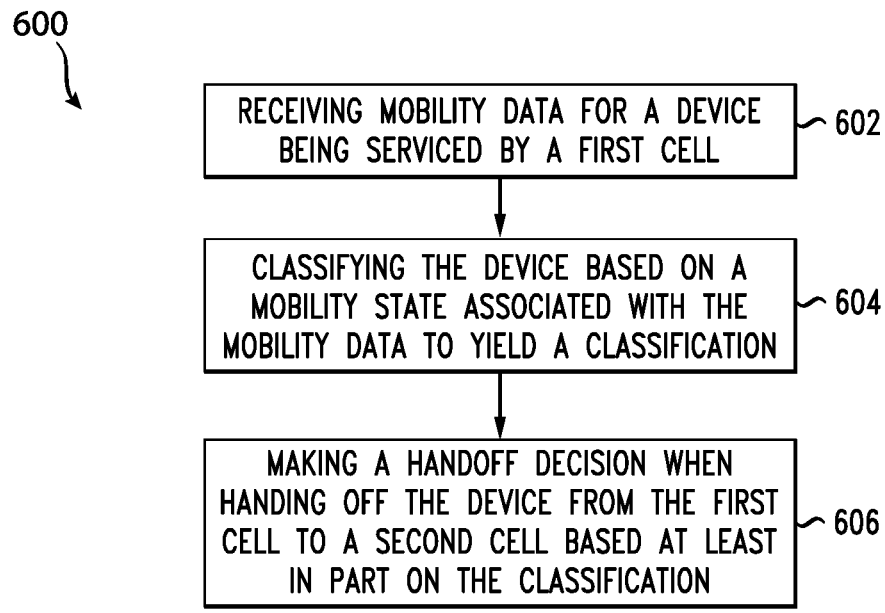
FIG. 6 illustrates an example method.

FIG. 6 illustrates an example method. The method can be performed on one or more of a mobile device and a system or network based processor. The method includes receiving mobility data for a device being serviced by a first cell (602), classifying the device based on a mobility state associated with the mobility data to yield a classification (604) and making a handoff decision when handing off the device from the first cell to a second cell based at least in part on the classification (606). The mobility state can be computed from the mobility data or estimated from the mobility data. The boundary that defines a mobility class is fixed or variable and when the boundary is variable, the boundary can be re-set.

When making a handoff decision, each classification can include at least one of a preferred cell type and at least one acceptable cell type. The preferred cell type for a slow speed classification can include a micro cell type and a small cell type, and an acceptable cell type for the slow speed classification can include a large cell type. The preferred cell type of a medium speed classification can include the small cell type, and the acceptable cell type for the medium speed classification can include the large cell type. The preferred cell type of a fast classification can include the large cell type, and the acceptable cell type for the fast classification can be none. In one aspect, the device only chooses a non-preferred cell type when a received signal is stronger than a higher threshold compared to a threshold required for a preferred cell type.

When making a handoff decision, a reselection can be triggered when the first cell no longer provides a sufficient signal and when the first cell is of a non-preferred type, and wherein making the handoff decision includes handing off to the second cell when the second cell is of the preferred type and is suitable. The classification can include a location of a device in the first cell and a path traveled across the first cell. Making the handoff decision can be further based at least in part on a first spectral efficiency of the first cell and a second spectral efficiency of the second cell. Further, making the handoff decision can be based at least in part on a bandwidth used by the device and available bandwidth of the second cell.

Figure 7:
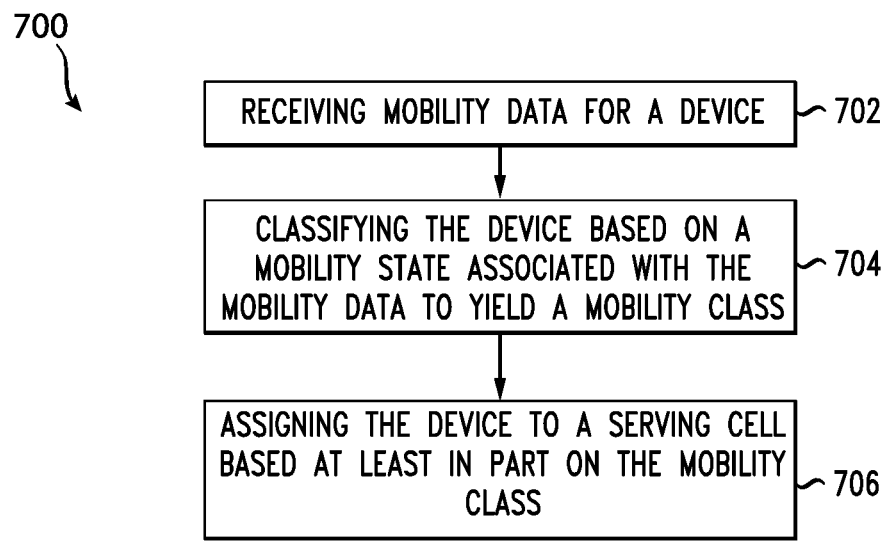
FIG. 7 illustrates another example method.

FIG. 7 illustrates another example related to the cell assignment aspect of this disclosure. A method includes receiving mobility data for a device (702), classifying the device based on a mobility state associated with the mobility data to yield a mobility class (704) and assigning the device to a serving cell based at least in part on the mobility class (706). When assigning the device to serving cell, each mobility class includes at least one of a preferred cell type and at least one acceptable cell type. The preferred cell type for a slow speed classification can include a micro cell type and a small cell type, and an acceptable cell type for the slow speed classification can include a large cell type. The preferred cell type of a medium speed classification can include the small cell type, and the acceptable cell type for the medium speed classification can include the large cell type. The preferred cell type of a fast classification can include the large cell type, and the acceptable cell type for the fast classification can be none. In one aspect, the device only chooses a non-preferred cell type when a received signal is stronger than a higher threshold compared to a threshold required for a preferred cell type.

When assigning the device to the serving cell, a reselection can be triggered when a first cell no longer provides a sufficient signal and when the first cell is of a non-preferred type, and wherein assigning the device to the serving cell includes assigning the device to a second cell when the second cell is of the preferred type and is suitable.

The mobility class can include a location of the device in the serving cell or a path traveled across the serving cell. Assigning the device to the serving cell can be further based at least in part on a spectral efficiency of the serving cell. Assigning the device to the serving cell can be further based at least in part on a bandwidth used by the device and available bandwidth of the serving cell. In another aspect, assigning the device to the serving cell can be further based at least in part on multiple prioritized lists of cells, each list of the multiple prioritized lists of cells including cells of a same type. Cells in a higher priority list are measured more frequently than cells on a lower priority list.

Once a system with device classification and assignment to cell types is in place, the system can be monitored to track the distribution of users and load level across cells. If the monitoring detects strong imbalances of cell loads, then in addition to adjusting the power level of cells, the concepts disclosed herein make it possible to dynamically adjust the mobility class boundaries in order to optimize or improve the spectral efficiency and capacity of the network.

One example of such a condition is the temporary concentration of slow users in a certain area. Under such circumstances, reducing the value of the class boundaries would allow more users to be classified as more mobile and get preference for being served by larger cells. Another option is to reduce the power of micro cells in the area so that fewer users are assigned to them.

Figure 8:
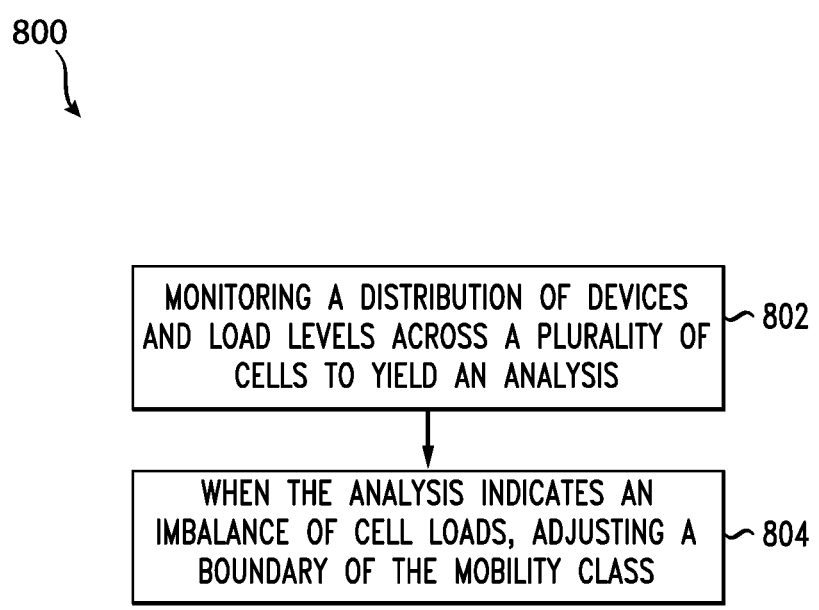
FIG. 8 illustrates another example method.

FIG. 8 illustrates an example method for balancing cell loads in a network in which a device is classified into a mobility class based on mobility data and the device is assigned to a serving cell based at least in part on the mobility class. The method includes monitoring a distribution of devices and load levels across a plurality of cells to yield an analysis (802), and when the analysis indicates an imbalance of cell loads, adjusting a boundary of the mobility class (804).

When the analysis indicates an imbalance of cell loads, the method can include adjusting a power level at least one cell of the plurality of cells. When the analysis indicates the imbalance of cell loads, the method further includes performing both of adjusting the power level at least one cell of the plurality of cells and adjusting the boundary of the mobility class. Adjusting the boundary of the mobility class can include increasing an upper speed associated with an upper boundary of the mobility class and/or decreasing a lower speed associated with a lower boundary of the mobility class. Adjusting a power level at least one cell of the plurality of cells or adjusting a boundary of the mobility class can improve or optimize a spectral efficiency of the network relative to a previous spectral efficiency prior to the adjusting of the power level or the boundary of the mobility class. Adjusting a power level at least one cell of the plurality of cells or adjusting a boundary of the mobility class can improve or optimize a capacity of the network relative to a previous capacity prior to the adjusting of the power level or the boundary of the mobility class. The device can be assigned to the serving cell based at least in part on multiple prioritized lists of cells, each list of the multiple prioritized lists of cells including cells of a same type or at least sharing a threshold number of characteristics.

Figure 9:
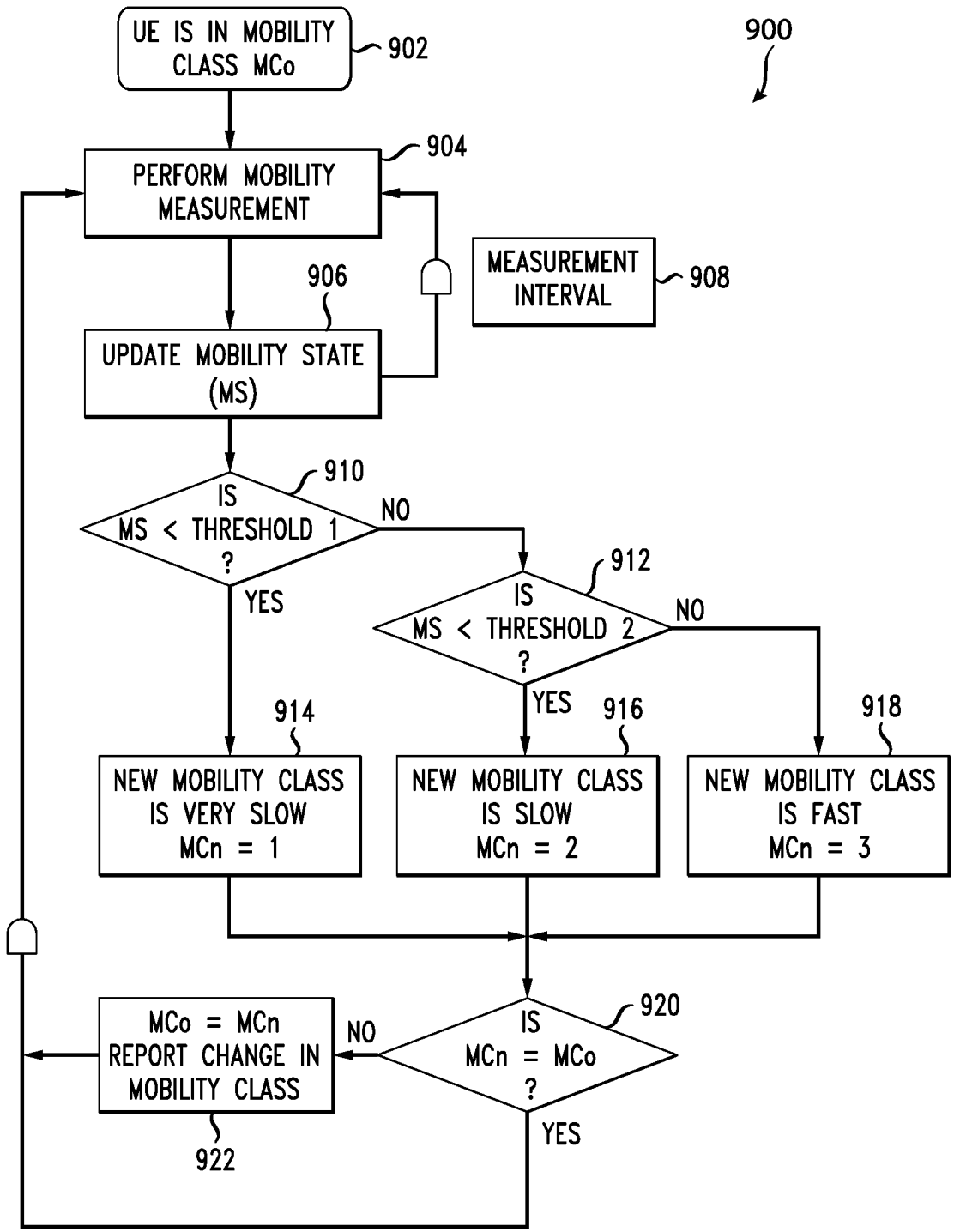
FIG. 9 illustrates a method related to updating a mobility class.

FIG. 9 illustrates another method of setting a mobile class and updating the mobility class setting. In the first step, the mobile device is in a mobility class MC0 (902). The system will perform a mobility measurement (904) to update the mobility state (MS) (906). This measurement can occur at a fixed or variable measurement interval (908). Next, the system determines whether the mobility state is less than a threshold 1 (910). If not, the system determines whether the mobility state is less than threshold 2 (912). If the mobility state is not less than threshold 2, then the system determines that a new mobility class is in a category such as fast and sets a variable MCn=3 (918). If the mobility state is less than threshold 2, then the system determines that the mobility class is another category such as slow and sets a variable MCn=2 (916). If the mobility state is less than threshold 1, then the system determines that the new mobility class is in yet another category such as very slow and sets MCn=1 (914). The flow from each of steps (914), (916) and (918), is to then determine whether MCn=MC0 (920). If not, then the system assigns MC0 to be MCn and reports the change in mobility class (922). If MCn does equal MC0, then the flow returns back to the step of performing the mobility measurement (904) and the process essentially starts again.

In another aspect, the method can include receiving mobility data for a device being serviced by a first cell, wherein the mobility data includes a vector (or other data structure) indicating a motion of the device. The mobility data can be independent of a data use pattern and a data rate associated with the device. The motion of the device can include any data associated with motion of the device. For example, the device might be moving vertically and in no particular north or south direction. The mobility data can include a simple yes/no value indicating that the device is in motion. The mobility data can include a rate of movement of the device. The mobility data can also include data characterizing the speed as slow, medium, fast, or in specific value such as 10 mph, 60 mph, and so forth.

The method includes classifying the device based on the mobility data to yield a classification. When making a reselection or a handoff decision, a cell type for the classification can include at least one of a preferred cell type and at least one of an acceptable cell type. The at least one of the preferred cell type can include at least one cell from a prioritized list of cells. A mobility state can be computed or estimated from the mobility data. In one aspect, the vector can include a plurality of dimensions. Optionally, one or more of the dimensions can include time. The mobility state associated with the mobility data can also be associated with a rate of movement of the device. The classification can be one of a slow speed, a medium speed and a fast speed.

In another aspect, a boundary associated with the classification can be one of fixed or variable. For example, one or more cells in a network can have defined boundaries in terms of geographic size. The boundaries can be fixed or variable, which values can depend on a number of factors, including the classification. In other words, if the device is classified with a first classification, that can be reported such that when making a reselection or a handoff decision, the boundaries associated with the cells might be variable. For example, if the mobility data yields to a classification of the device as having a fast speed, then a boundary associated with one or more cells involved in a reselection or a classification, can be defined as variable such that they can expand in order to overlap with the device either in its current geographic position or an expected or predicted geographical position so as to improve the reselection or handoff process. Such a variable use of the boundary can, for example, move up in time the beginning of communication between the device and a particular cell over when the cell would begin exchanging data with the device under a normal boundary size.

When the boundary is variable, it can also be used to balance a load between cells. For example, if a cell reduces its boundary, some devices at the peripheral edges may find themselves outside the boundary of that cell and serviced by other cells.

A control plane and/or a user plane can include at least one signal indicator identifying to a controlling node one or more elements of the mobility data of the device or the classification of the device.

In one aspect, the preferred cell type for a slow speed classification includes a micro cell type and a small cell type, and an acceptable cell type for the slow speed classification includes a large cell type. The preferred cell type of a medium speed classification can include a small cell type, and the acceptable cell type for the medium speed classification can include a large cell type. In another aspect, the preferred cell type of a fast classification can include the large cell type, and the acceptable cell type for the fast classification can include none. These of course are only examples of particular cell types being associated with particular classifications of the device.

The device in one aspect only chooses a non-preferred cell type when a received signal is stronger than a higher threshold compared to a threshold required for a preferred cell type. In another aspect, when making a reselection or handoff decision, the reselection is triggered when the first cell no longer provides a sufficient signal or when the first cell is of a non-preferred type. Making the handoff decision in this scenario can include handing off to a second cell when the second cell is one of the preferred cell type or is suitable.

In another aspect, the classification can include a location of the first cell and a path traveled across the first cell. The path traveled across the first cell can include a predicted path based on the mobility data and/or an actual path traveled by the device at least in part through the first cell. Thus, the vector indicating a motion of the device can include such information that can be utilized to identify the path that the device has taken or likely will take. Furthermore, mapping information, historical information, machine learning information, data associated with other devices, and so forth can be utilized in connection with the mobility data to identify information about the previous movement of the device as well as a predicted movement or path of the device. This information can be utilized when making one or more of the classification of the device as well as the reselection or handoff decision for the device.

In another aspect, making the handoff decision can further be based at least in part on a first spectral efficiency of the first cell and a second spectral efficiency of a second cell. Making the reselection or handoff decision can further be based at least in part on a bandwidth used by the device and an available bandwidth of a second cell.

It is also important to note that different aspects or examples of the present disclosure can be practiced on different devices. For example, in one aspect, the steps that are performed by a mobile device can be claimed as an example. Thus, the mobile device can perform steps such as transmitting mobility data to a remote device, or performing steps of classification for the device based on the mobility data. In a reselection or hand over process, the device will also transmit and/or receive communication information for handling the handoff. Accordingly, one aspect covers all of the various functionality that would be performed on the device.

In another aspect, the functionality could be performed in the network at a controller, or server, base station, or other device or combination of devices. Thus, the steps of receiving mobility.data, classifying the device, making or managing handoff decisions, and so forth, could be performed by one or more network—based components. An aspect of this disclosure would be the steps performed by one or more of such devices. These devices may cover multiple devices managed by a single entity and thus would include one or more processors, storage devices, and so forth.

Figure 10:
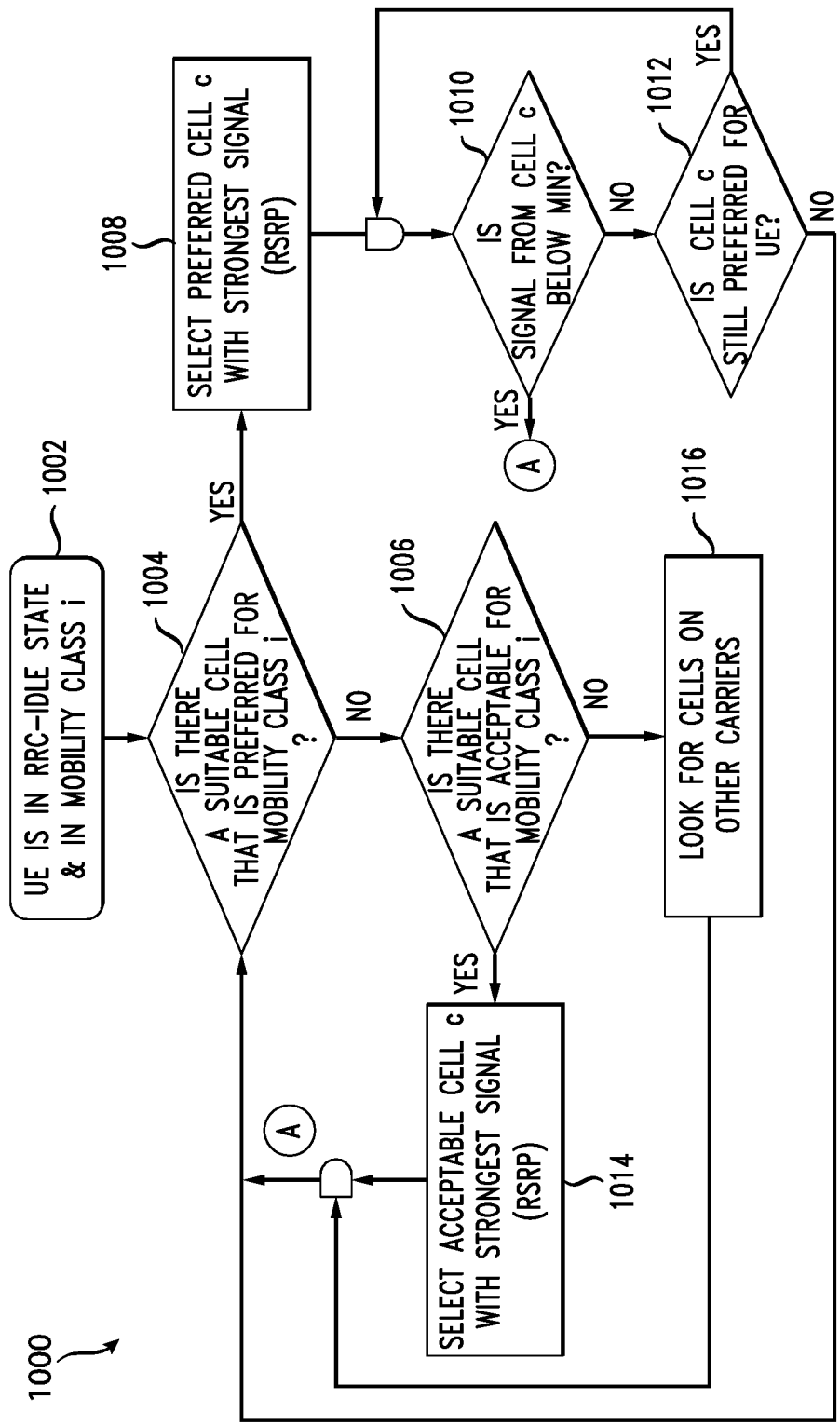
FIG. 10 illustrates a method related to selection of cells for mobile device.

FIG. 10 illustrates a radio resource control idle rule process. First, the system determines that the mobile device is in a radio resource control-idle state and/or a mobility class I (1002). The method next determines whether there is a suitable cell that is preferred for mobility class I (1004). If yes, then the system selects the preferred cell C with the strongest signal (1008). Next, after a set delay (or a variable delay or a delay based on some parameter), the system determines whether the signal from cell C is below a minimum value (1010). Of course, the signal from cell C would also be equal to or below a determined value. If no, then the system determines whether the cell C is still preferred for the mobile device (1002). If yes, then the flow returns after a delay (fixed, variable, or even no delay) back to the determination (1010). It is noted that if the result of the determination in step (1010) is that the signal from the cell C is below a minimum, then the flow proceeds to position A which, as is seen in FIG. 10, returns the process to step (1004) of determining whether there is a suitable cell that is preferred for mobility class I. Returning to step (1012), if the cell C is not still preferred for the mobile device, then the process returns again to the determination step (1004).

If the determination from step (1004) is that there is not a suitable cell that is preferred for mobility class I, then the system determines whether there is a suitable cell that is acceptable for mobility class I (1006). If yes, then the system selects the acceptable cell C with the strongest signal (1014). If there is not a suitable cell that is acceptable from mobility class I, the system looks for cells on other carriers (1016) and the process continues to point A and ultimately returns back to the determination step (1004).

Figure 11:
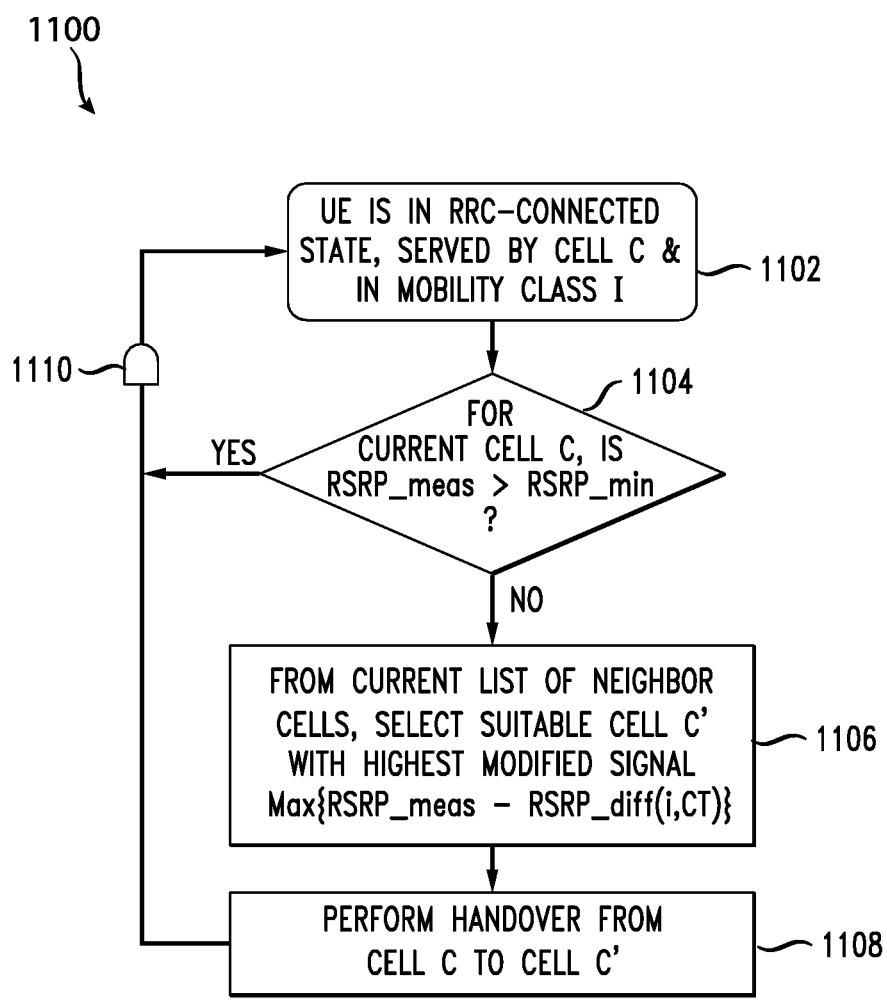
FIG. 11 illustrates an RRC-connected rule.

FIG. 11 illustrates a handover rule 1100 for radio resource control connected device. At any point in time, a connected device is served by a cell C and is in mobility class I (1102). Every measurement interval (1110), the system checks if the signal strength RSRP_meas is above a minimum level RSRP_min (1104). If it is, there is no action until the next measurement time. If it is not, then the system selects from the neighbor list the cell with the strongest signal modified by a factor RSRP_diff which depends on the mobility class and cell type (1106). After the new cell is so determined, the system performs a handover to that cell (1108), which now becomes the serving cell. It is noted that an example algorithm to determine what "suitable" means could be RSRP_MEAS>RSRP_MIN+RSRP_DIFF (MC, CT).

Figure 12:
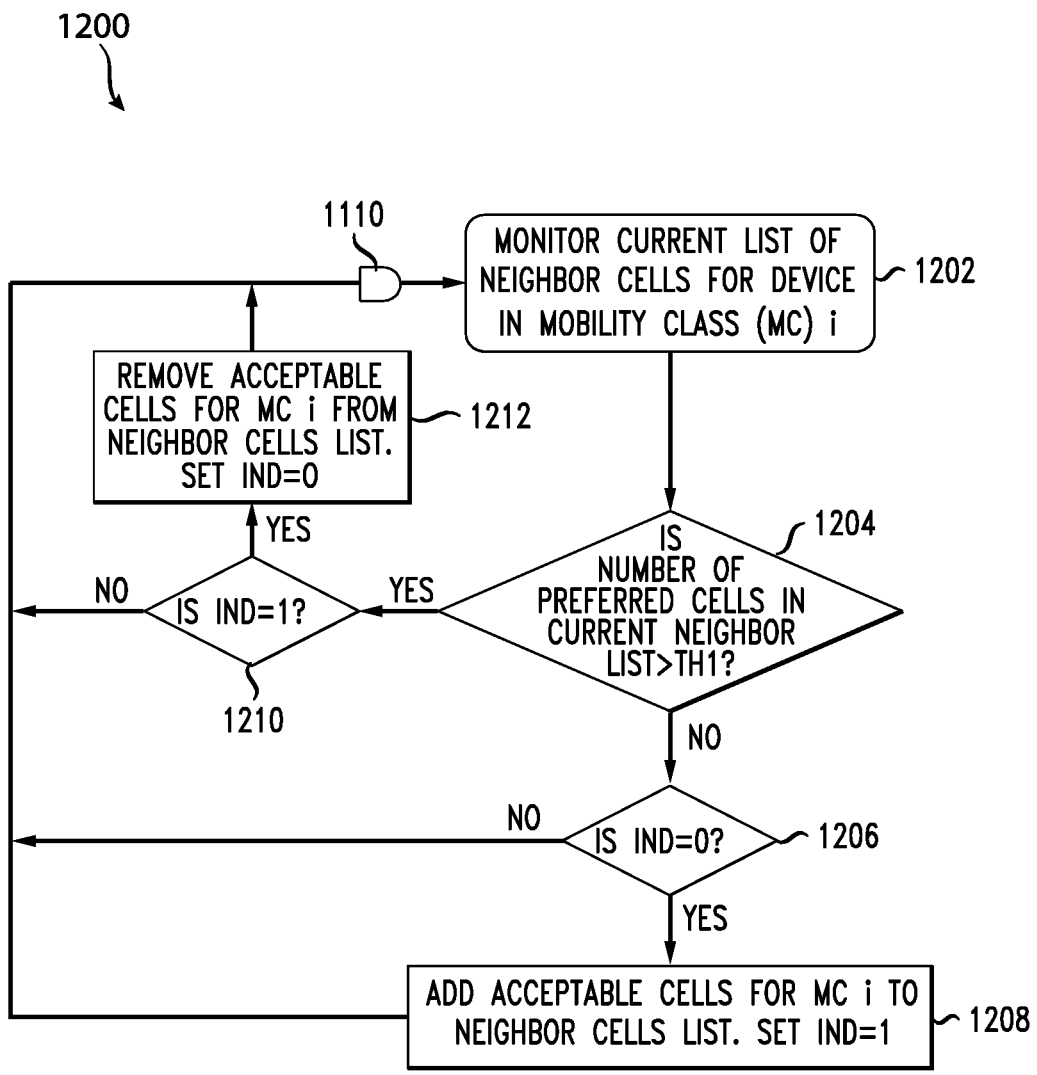
FIG. 12 illustrates a method for updating a neighbor list.

FIG. 12 describes an example process 1200 for modifying the neighbor cell list to account for the mobility class. The system recognized an RRC-connected device in mobility class I (1202) and it keeps a list of neighbor cells that are suitable and candidates to become serving cells. These neighbor cells can be of any type, and with one of the rules described earlier, each one of these cells is classified as preferred or acceptable. The system also maintains an indicator IND, which is set to 0 whenever the device moves to a new serving cell. Every measurement interval 1110, the system checks if the number of preferred cells in the neighbor list is higher than a threshold TH1 (1204). If it is and IND is equal to 1 (1210), all acceptable cells are removed for the neighbor list (1212). Going back to step 1204, if the number of preferred cells is not above the threshold, then if IND is equal to 0 (1206), all suitable acceptable cells are added to the neighbor list (1208). Otherwise, no action is taken, and the system waits for the next check (1202).

Another aspect of this disclosure relates to a method and apparatus for mobility-based cell assignment in heterogeneous networks. Prior art recognized the need and potential advantage of having different types of cells to improve coverage and usage of spectrum, giving rise to heterogeneous networks (het nets). Furthermore, there are patents dealing with estimation of user mobility. However, the issue of how to combine the two to actually assign users to cells based on mobility information is still open. In addition, there is prior art on how to improve the execution of handovers, but this disclosure addresses reducing the rate of handovers. Several aspects of this disclosure include obtaining a mobility estimation based on GPS data associated with a device, using smart car technology to convey speed, obtaining a mobility estimation based on handover rate or time in cell, a non-mobile declaration by a UE.

Next is discussed the assignment of users to cells based on above classification. There can be a set of rules that combine mobility state, cell type, and current cell loads to rank candidate cells for a new connection. Another rule can be implemented to decide when to perform handover and which cell to move to. An example method for obtaining or estimating the mobility state in a wireless communications network can be implemented using a control processor to optimize or consider one or more of the following factors: a power level of the serving cell and the neighboring cells, a distance estimation of the serving cell and the neighboring cells, and the ability to handle a cell change from a serving cell to a neighboring cell while calculating the estimate. The power level can be of just a neighboring call or of all the cells and can be viewed in the aggregate or individually with different power levels considered for different types of neighboring cells. The distance estimation can include geographic space of a respective neighboring cell (how big/small is the cell relative to others?), or a distance to the neighboring cell from a current position of the device. The ability to handle a cell change might take into account that a potential neighboring cell is of the same type as the current cell or is of different type (i.e., WiFi versus LTE).

The control processor can be in at least one of the UE in the serving cell. The mobility estimation can be based on the GPS location of the UE. The estimate of speed makes use of smart car technology. The mobility estimation can be based on handover rate or time in cell. The mobility estimation can be based on a non-mobile declaration by the UE. The mobility estimation can be based on the ability to determine signal suppressed information from a serving cell to a neighboring cell. Any of these features can be combined with the systems and methods disclosed herein.

In one aspect, a system for obtaining or estimating the mobility state in a wireless communications network can use a control processor to optimize or consider one or more of the following factors: a power level of the serving cell and the neighboring cells, a distance estimation of the serving cell and the neighboring cells, an ability to handle cell change from a serving cell to a neighboring cell while calculating the estimate.

In another aspect, a method for classifying a UE in a wireless communications network is disclosed for using a control processor to optimize the following factors: a power level of the serving cell and the neighboring cells, a distance estimation of the serving cell and the neighboring cells and/or an ability to handle cell change from a serving cell to a neighboring cell while calculating the estimate.

In yet another example, a system is disclosed for classifying user equipment (UE) in a wireless communications network using a control processor to optimize the following factors: a power level of the serving cell and the neighboring cells, a distance estimation of the serving cell and the neighboring cells and/or an ability to handle cell change from a serving cell to a neighboring cell while calculating the estimate.

Examples within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In another example, a method can include receiving mobility data for a device being serviced by a first cell, wherein the mobility data includes a vector indicating a motion of the device and classifying the device based on the mobility data to yield a classification, wherein, when making a reselection or a handoff decision, a cell type for the classification includes at least one of a preferred cell type and at least one of an acceptable cell type.

In another example, a method can include receiving mobility data in a virtual layer for a device being serviced by a first cell in a heterogeneous network including at least a non-cellular node type and a cellular node type, and classifying the mobility data in the virtual layer for the device to yield a classification, wherein the classification includes an access type and an indication of an access priority to the access type, wherein the access priority includes at least an acceptable access type or a preferred access type, and wherein the access type is identified from a list of access types which includes at least one of a non-cellular node type and a cellular node type.

The method further includes measuring traffic characteristics from a prioritized list of traffic characteristics, the traffic characteristics including, for a plurality of devices operating within the heterogeneous network, the plurality of devices including the device and at least one additional device, two or more of (1) an adjustment of a node boundary of a node in the heterogenous network, (2) an adjustment of a power level of a node in the heterogenous network, (3) balancing of a cell load of a node in the heterogenous network, (4), a distribution of a load amongst nodes in the heterogenous network based on communications with the plurality of devices, (5) a distribution of the plurality of devices in the heterogeneous network, and (6) a distribution of the plurality of devices and a load level of respective nodes in the heterogenous network, to yield a measurement, and making a handoff decision in the virtual layer when handing off the device from the first cell to a second cell based at least in part on the classification and the measurement.

A mobility state can be computed or estimated from the mobility data. The vector can include a plurality of dimensions, and wherein at least one of the plurality of dimensions is time. A mobility state associated with the mobility data can be a rate of movement of the device. The classification also can be one or more of a slow speed, a medium speed and a fast speed. A boundary associated with the classification can be one of fixed or variable. The boundary can be variable and can be used to balance a load between cells.

In another aspect, a control plane can include at least one signal indicator identifying to a controlling node one or more elements of the mobility data of the device or the classification of the device. The preferred cell type for a slow speed classification can include a micro cell type and a small cell type, and an acceptable cell type for the slow speed classification includes a large cell type. The preferred cell type of a medium speed classification can include a small cell type, and the acceptable cell type for the medium speed classification includes a large cell type. The preferred cell type of a fast classification can include the large cell type, and the acceptable cell type for the fast classification includes none.

The device may only choose a non-preferred cell type when a received signal is stronger than a higher threshold compared to a threshold required for a preferred cell type. When making a handoff decision, a reselection can be triggered when the first cell no longer provides a sufficient signal or when the first cell is of a non-preferred type, and wherein making the handoff decision includes handing off to a second cell when the second cell is one of the preferred cell type or is suitable. In another aspect, the classification can include a location of the first cell and a path traveled across the first cell. Making the handoff decision an further be based at least in part on a first spectral efficiency of the first cell and a second spectral efficiency of a second cell. Making the reselection or handoff decision can further be based at least in part on a bandwidth used by the device and an available bandwidth of a second cell. The mobility data an also be independent of one of a data use pattern and a data rate. The at least one of the preferred cell type can include at least one cell from a prioritized list of cells. Any of the concepts disclosed above in any example can be combined with any other concept to yield an example configuration or process that can be claimed.

A system example can include one or more processors and a computer-readable storage device storing instructions which, when executed by the processor, cause the one or more processors to perform operations including: receiving mobility data for a device being serviced by a first cell, wherein the mobility data includes a vector indicating a motion of the device and classifying the device based on the mobility data to yield a classification, wherein, when making a reselection or a handoff decision, a cell type for the classification includes at least one of a preferred cell type and at least one of an acceptable cell type.

In another example, the system can include a processor and a computer-readable storage device storing instructions which, when executed by the processor, cause the processor to perform operations including receiving mobility data for a device being serviced by a first cell in a heterogeneous network including at least a non-cellular node type and a cellular node type, and classifying the mobility data in a virtual layer for the device to yield a classification, wherein the classification includes an access type and an indication of an access priority to the access type, wherein the access priority includes at least an acceptable access type or a preferred access type, and wherein the access type is identified from a list of access types which includes at least one of a non-cellular node type and a cellular node type. The operations further include measuring traffic characteristics in the virtual layer from a prioritized list of traffic characteristics, the traffic characteristics including, for a plurality of devices operating within the heterogeneous network, the plurality of devices including the device and at least one additional device, two or more of (1) an adjustment of a node boundary of a node in the heterogenous network, (2) an adjustment of a power level of a node in the heterogenous network, (3) balancing of a cell load of a node in the heterogenous network, (4), a distribution of a load amongst nodes in the heterogenous network based on communications with the plurality of devices, (5) a distribution of the plurality of devices in the heterogenous network, and (6) a distribution of the plurality of devices and a load level of respective nodes in the heterogenous network, to yield a measurement and making a handoff decision in the virtual layer when handing off the device from the first cell to a second cell based at least in part on the classification and the measurement.

A separate example can include a non-transitory computer-readable storage device storing instructions which, when executed by a computing device, cause the computing device to perform the operations described above.

The computer-readable storage device can store additional instructions which, when executed by the one or more processors, cause the one or more processors to perform further operations including only choosing a non-preferred cell type when a received signal is stronger than a higher threshold compared to a threshold required for the preferred cell type. The at least one of the preferred cell type can include at least one cell from a prioritized list of cells. The operations can include receiving mobility data for a device being serviced by a first cell, wherein the mobility data includes a vector indicating a motion of the device and classifying the device based on the mobility data to yield a classification, wherein, when making a reselection or a handoff decision, a cell type for the classification can includes at least one of a preferred cell type and at least one of an acceptable cell type.

The non-transitory computer-readable storage device can store additional instructions which, when executed by the one or more processors, cause the one or more processors to perform further operations including only choosing a non-preferred cell type when a received signal is stronger than a higher threshold compared to a threshold required for the preferred cell type. The at least one of the preferred cell type can include at least one cell from a prioritized list of cells.

The various examples described above are provided by way of illustration only and should not be construed to limit the scope of the disclosure. Various modifications and changes may be made to the principles described herein without following the example examples and applications illustrated and described herein, and without departing from the spirit and scope of the disclosure. Claim language reciting "at least one of" a set indicates that one member of the set or multiple members of the set satisfy the claim.

We claim:

1. A method comprising:
   receiving data comprising mobility data or session data in a control plane for a device being serviced by a first cell in a heterogeneous network comprising at least a non-cellular node type and a cellular node type;
   classifying the data in the control plane for the device to yield a category, wherein the category comprises an access type and an indication of an access priority to the access type, wherein the access priority comprises at least an acceptable access type or a preferred access type, and wherein the access type is identified from a list of access types which comprises at least one of a non-cellular node type and a cellular node type;
   measuring traffic quality of service from a prioritized list of traffic quality of service; and
   making a handoff decision in the control plane when handing off the device from the first cell to a second cell based at least in part on the category or the measurement.

2. The method of claim 1, wherein the data comprises a vector indicating a direction of motion of the device, and wherein the vector comprises a first dimension associated with time and a second dimension.

3. The method of claim 1, wherein the category is one of slow speed, medium speed and fast speed.

4. The method of claim 1, wherein a boundary that defines a mobility class is one of fixed or variable and wherein when the boundary is variable, the boundary is used to balance a load between cells.

5. The method of claim 1, wherein a mobility state comprises a rate of movement of the device.

6. The method of claim 1, wherein the preferred access type for a slow speed category comprises a micro cell type and a small cell type, and an acceptable access type for the slow speed category comprises a large cell type.

7. The method of claim 1, wherein the preferred access type of a medium speed category comprises a small cell type, and the acceptable access type for the medium speed category comprises a large cell type.

8. The method of claim 1, wherein the preferred access type of a fast category comprises a large cell type, and the acceptable access type for the fast category comprises none.

9. The method of claim 1, wherein the device only chooses a non-preferred cell type when a received signal is stronger than a higher threshold compared to a threshold required for a preferred cell type.

10. The method of claim 9, wherein when making a handoff decision, a reselection is triggered when the first cell no longer provides a sufficient signal or when the first cell is of a non-preferred type, and wherein making the handoff decision comprises handing off to the second cell when the second cell is one of the preferred cell type or is suitable.

11. The method of claim 1, wherein the category comprises a location of the first cell and a path traveled across the first cell.

12. The method of claim 1, wherein making the handoff decision is further based at least in part on a first spectral efficiency of the first cell and a second spectral efficiency of the second cell.

13. The method of claim 1, wherein making the handoff decision is further based at least in part on a bandwidth used by the device and an available bandwidth of the second cell.

14. A system comprising:
   a processor; and
   a computer-readable storage device storing instructions which, when executed by the processor, cause the processor to perform operations comprising:
      receiving data comprising mobility data or session data for a device being serviced by a first cell in a heterogeneous network comprising at least a non-cellular node type and a cellular node type;
      classifying the data in a control plane for the device to yield a category, wherein the category comprises an access type and an indication of an access priority to the access type, wherein the access priority comprises at least an acceptable access type or a preferred access type, and wherein the access type is identified from a list of access types which comprises at least one of a non-cellular node type and a cellular node type;
      measuring traffic quality of service in the control plane from a prioritized list of traffic quality of service; and
      making a handoff decision in the control plane when handing off the device from the first cell to a second cell based at least in part on the category or the measurement.

15. A non-transitory computer-readable storage device storing instructions which, when executed by a computing device, cause the computing device to perform further operations comprising:
   receiving data comprising mobility data or session data in a control plane for a device being serviced by a first cell in a heterogeneous network comprising at least a non-cellular node type and a cellular node type;
   classifying the data in the control plane for the device to yield a category, wherein the category comprises an access type and an indication of an access priority to the access type, wherein the access priority comprises at least an acceptable access type or a preferred access type, and wherein the access type is identified from a list of access types which comprises at least one of a non-cellular node type and a cellular node type;
   measuring traffic quality of service from a prioritized list of traffic quality of service; and
   making a handoff decision in the control plane when handing off the device from the first cell to a second cell based at least in part on the category or the measurement.

* * * * *